United States Patent Office 3,057,139
Patented Oct. 9, 1962

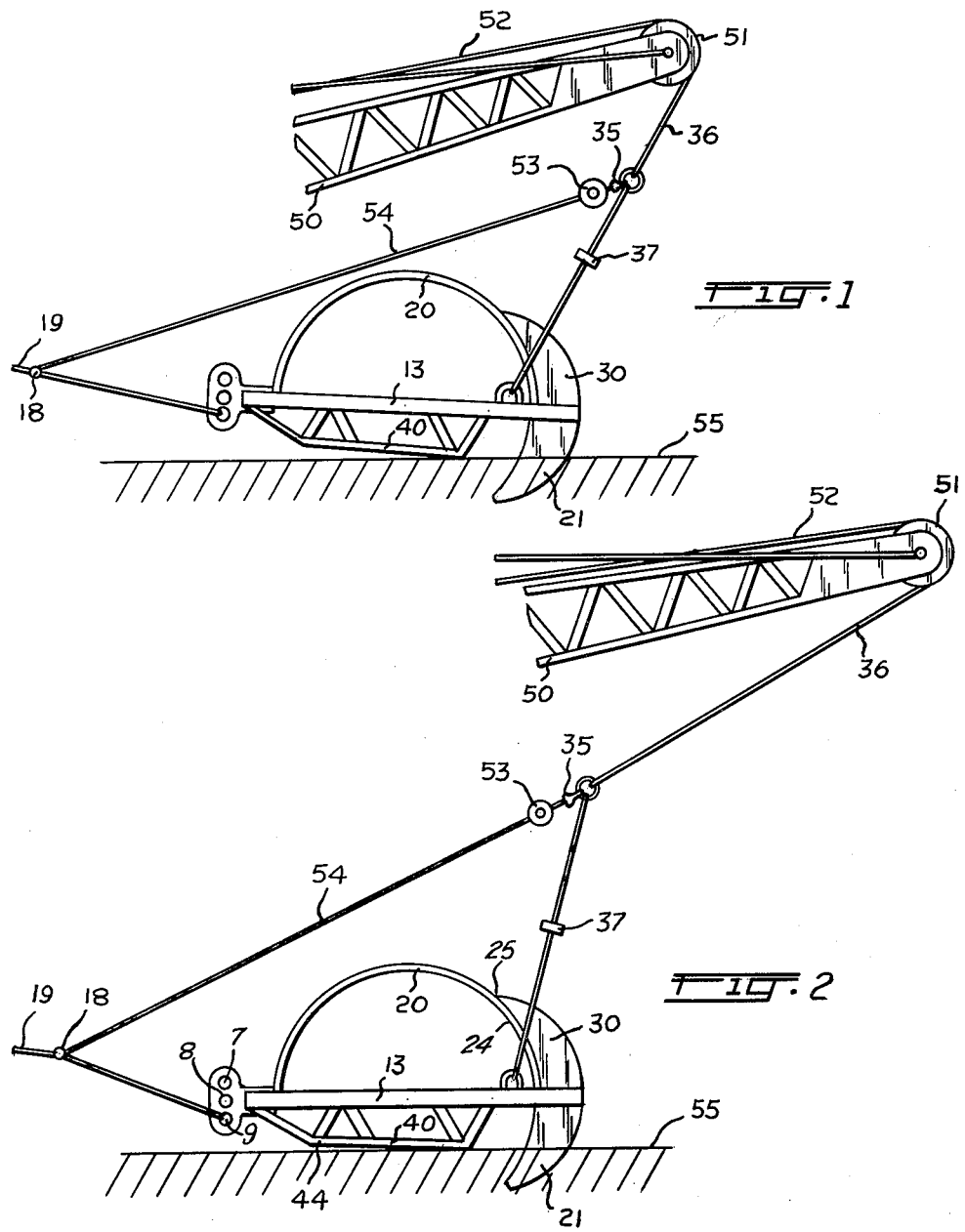

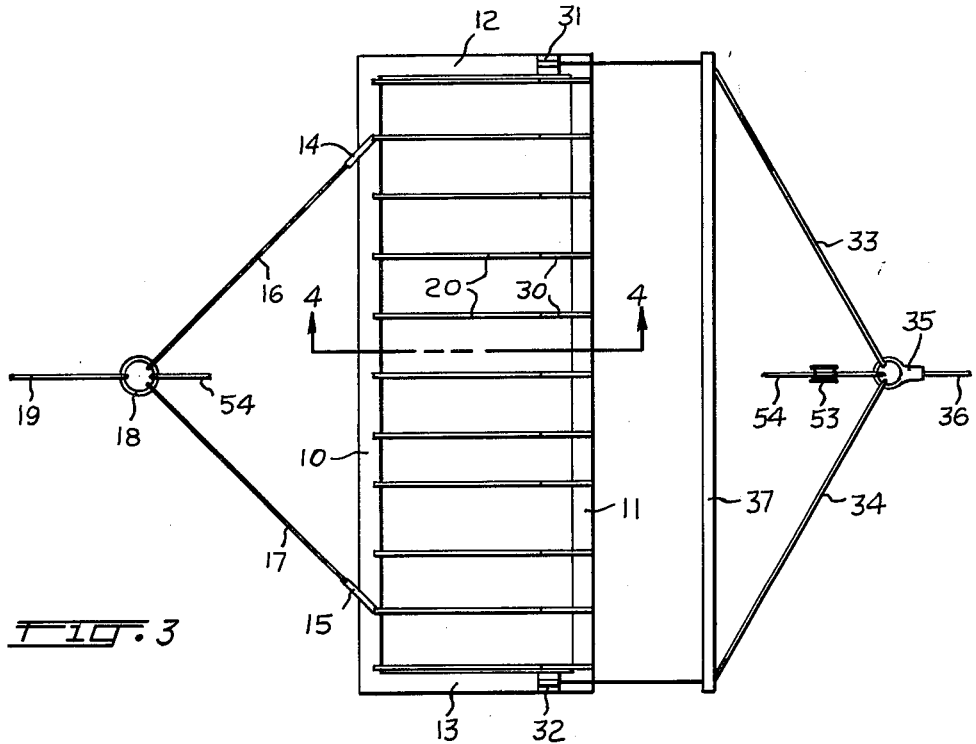
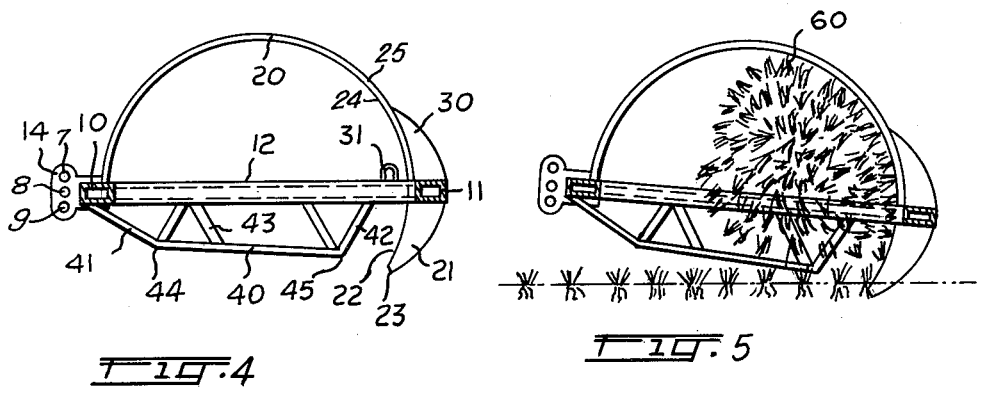

3,057,139
MEANS FOR COLLECTING VEGETATION IN ROLL FORM
Walter P. Lane, Rte. 1, Routt Road, Jeffersontown, Ky., and Mead B. Kinser, 4154 Reservoir Road, Louisville, Ky.
Filed Sept. 23, 1960, Ser. No. 58,133
7 Claims. (Cl. 56—8)

This invention relates to an improved apparatus for collecting vegetation and, more particularly, to a basket-rake type of apparatus in which the collected vegetation is formed into roll shape. The invention is especially useful in the clearing of vegetation from ditches, marshes, ponds, or the like. Such vegetation, as for example, water hyacinth or bullrushes, may be found growing on the surface of water, submerged under water, on land, or partly on land and water. Equipment used in removing the same preferably should be adaptable for employment without change in each of these environments. Various types of dragline buckets, clam-shell buckets, rakes, and other forms of apparatus have been suggested for use in collecting such vegetation, but so far as we are aware, have been attended by certain limitations as to use, size, cost, and the like. It is a purpose of the present invention to provide an apparatus wherein such limitations are substantially reduced.

An object of the invention is to provide an apparatus for collecting vegetation in roll form and which may be used in collecting vegetation from various environments.

Another object is to provide an apparatus for collecting vegetation in roll form without undue collection of mud and water.

A further object is to provide an apparatus for collecting vegetation in roll form and which may be readily manipulated to transport a collected roll and to be disengaged from a collected roll.

Other objects and advantages will become apparent as the description proceeds and when considered in conjunction with the accompanying drawings in which:

FIG. 1 is a diagrammatic view indicating one form of apparatus during the collection of a roll of vegetation.

FIG. 2 is a diagrammatic view indicating one form of apparatus during the transporting of a roll of detached vegetation.

FIG. 3 is a plan view of the framework of the apparatus including portions of the manipulating lines attached thereto.

FIG. 4 is a sectional view taken on line 4—4 of FIG. 3, and

FIG. 5 is a view similar to FIG. 4 and showing schematically the position occupied in the apparatus by a partially collected roll of vegetation.

In accordance with the invention we provide a rigid framework with means for lifting and lowering the framework and for moving the same forwardly and rearwardly across a surface from which vegetation is to be removed, and while maintaining that framework generally parallel to that surface. The means for lifting and lowering the framework and for moving it forwardly and rearwardly across such surface is conventional and accordingly is illustrated in a diagrammatic manner since many forms of such a means, for example, the well-known Model K Drag Line Crane manufactured by Insley Manufacturing Corporation, Indianapolis, Indiana, may be used. The framework, however, in combination with the parts attached thereto forms a novel portion of the invention and such framework has attached thereto curved teeth extending therebelow and curved vegetation-confining guides extending thereabove, both of which mutually cooperate to form the vegetation detached by the teeth into a roll confined by the guides. Means also is carried by the framework to stabilize the same against excessive longitudinal tipping and to avoid undue digging penetration by the teeth.

Referring now to FIGS. 3 and 4, the framework may comprise a first elongated member 10, a second elongated member 11 generally parallel to the first member, and a pair of end members 12 and 13 connected to the ends of the respective elongated members and forming a rigid structure. These members may be formed in any suitable structural shape and of material having adequate strength, and in one commercial unit have been formed in box like shape from steel plate providing large surface areas to which the parts later to be described, may be welded. At spaced locations along the first member, and preferably at equal distances from the end members, a pair of cable anchors 14 and 15 are securely fastened as by welding in partially enveloping relation to the first member. Each anchor is provided with a plurality of vertically arranged apertures, as shown at 7, 8 and 9, and into a selected one of which the end of one of the respective cable or chains 16 and 17 may be engaged. At their other ends these cables are affixed to a clevis 18 attached to a haul line 19.

Rigidly attached at their respective ends to the first member 10 and to the second member 11 is a plurality of concave, downwardly facing guides 20 spaced from each other longitudinally of the framework. This spacing preferably is uniform, and at a distance sufficient to enable the collected vegetation to be confined interiorly of these guides, but to permit water and other non-vegetative material to pass freely betwen adjacent guides. Various curvatures may be given to these guides, a semicircular shape as shown being preferred.

Projecting downwardly from the second member 11 and rigidly affixed thereto is a plurality of raking teeth 21 having a concave inner surface 22 extending to a tip or end 23. The curvature of that inner surface preferably coincides with the curvature of the inner surface 24 of the guides, and each tooth preferably is arranged under a corresponding guide, although the invention as a whole is not limited to this precise arrangement. Since these teeth, both by reason of the weight of the assembly and by the force vectors placed thereon during operation of the apparatus, are required to undergo substantial loadings, it is preferred to reinforce the teeth and guides in the region adjacent their mountings upon the second member 11. This may be conveniently done by means of backing webs 30 welded to the upper surface of the member 11 in the plane of the tooth 21 and to the outer surface 25 of the guide 20. This web normally has a thickness no larger than that of the guide to which it is attached and thus provides no additional obstruction to material passing between adjacent guides. Mounted upon the respective end members of the framework and inboard of the rearmost ends thereof, a pair of eye bolts 31 and 32 are located. One end of the respective lifting cables 33 and 34 is attached in these eye bolts and the other ends thereof are attached to a clevis 35 connected to one end of a rehaul line 36. A suitable spacer bar 37 is interposed intermediate the ends of the respective lifting cables and serves to distribute the pull of those cables in the framework.

Depending from the respective end members of the framework is a pair of stabilizing skids one of which is seen in FIG. 4. These skids preferably are identical and include an inclined lower runner 40 connected to forwardly and rearwardly extending upwardly directed skid portions 41 and 42. These portions, as well as internal bracing members 43, are rigidly affixed to the end members of the framework. As will be noted, the skid runner slopes downwardly from its junction with the skid portion at 44 serving as a fulcrum point later to be described, but its lowermost area at 45 is located well forward of and above the tooth tip 23.

Referring now to FIGS. 1 and 2, it is contemplated that in usage the invention will be employed in connection with a conventional movable platform having a controlled power source for operating the usual boom 50, adjacent the end of which the usual pulley 51 will be mounted with a rehaul line 52 trained over that pulley and connected to line 36, as, for example, found in the Model K Drag Line Crane above mentioned. From that same platform the haul line 19 is extended to clevis 18. Connected at its ends between clevis 18 and a conventional pulley block 53 attached to the other clevis 35 is a lifting control line 54 serving to balance the framework in upright position during its several phases of operation.

The pulley block 53 serves to permit the end of line 54, which is trained thereover and normally attached to itself, to be optionally attached to the first member 10, as when a different lifting action upon the apparatus at the conlusion of a raking movement is desired. However, as shown in FIGURES 1 and 2, the line 54 generally is used with its fully extended length during the entire cycle of operation of the apparatus. With the foregoing description in mind the several objects and advantages of the invention will now be seen in connection with a typical operation of removal of vegetation from a surface on which it is growing as indicated at 55. The operator, by manipulating the rehaul lines 52 and 36 and snubbing the pay-out of line 19, causes the apparatus to be cast to the extremity of the area to be cleared. Thereupon, tension is relieved in line 36 and the apparatus settles into position with the teeth extending below that surface as seen in FIG. 1. In case the surface 55 represents a ground surface, the depth to which the teeth extend below that surface is governed by the contact of the skid portion 40 therewith when tension is relieved in line 36. However, if the surface 55 represents a submerged surface, other than a submerged ground surface, the contact of the skid portions is unimportant and the depth at which the teeth are maintained is then controlled by the relative tensions maintained in haul line 19, lift control balance line 54, and rehaul lines 52 and 36.

The operator then exerts pulling tension on haul line 19 and as the apparatus moves forward the teeth 21 engage the vegetation adjacent its roots and detach it from its anchorage. The detached vegetation is then directed upwardly as seen in layer 60 in FIG. 5 and is forced forwardly in contact with the guides 20. As the leading edge thereof is brought into contact with an additional layer of vegetation, the detached material assumes the general shape of a convolutely wound roll, it being understood that such vegetation usually is of a dense and matted nature and that relatively little bulging of the same into the space between adjacent guides will occur. Liquid and mud carried by the detached leaf and root portions of the vegetation is, however, largely voided into the space between those guides as the apparatus is moved along.

Upon formation of a roll of desired size, the operator exerts tension upon rehaul lines 52 and 36 sufficient to tilt the trailing portion of the apparatus upwardly, thus to reduce the depth of penetration of the teeth into surface 55. Thereafter, the haul line 19 may be actuated while a pay-out tension is still maintained in the rehaul lines and the roll of material may be transported to a deposit point without further addition thereto. Having transported the detached roll to the deposit point, the operator then places tension on rehaul lines 52 and 36 sufficient to lift the teeth from the surface 55 and upon which surface the stabilizing skids may pivot about their fulcrum points 44, as seen in FIG. 2. By suitable paying out the haul line 19, the apparatus then is automatically lifted from the collected roll and when freed of the collected roll is then cast outwardly for formation of the next roll.

It will be appreciated that the roll of collected vegetation is compressible and relatively heavy and that the downwardly facing opening between the lower side of the first member 10 and the tip 23 of tooth 21 is sufficient for the deposited roll to remain in place on the surface on which it has been deposited as the apparatus is detached therefrom. In general, the angle subtended by these portions of the apparatus, measured from a focal point of the concave guides 20, is at least 120°. The attachment of the cables 16 and 17 to their anchors 14 and 15, by engagement in the selected apertures 7, 8 or 9 thereof, may be readily changed to modify the setting of the teeth with respect to the roots of the vegetation being collected. As will now be apparent, the framework, when collecting the vegetation, occupies a position generally, but not necessarily, parallel to the surface from which the vegetation is removed and does not twist or topple over during use. The pair of stabilizing skid runners 40 in particular serves to prevent undue tipping of the structure along its longitudinal axis, as well as to prevent excessive depth of penetration of the teeth when such teeth are in contact with a ground surface. Moreover, the location of the haul lines, rehaul lines, and lift-control balance line in cooperation with the other elements of the structure, contributes to the stabilization of the apparatus during its employment.

Having thus described the invention and having shown one form for carrying out the purposes of the same, it will be apparent to those skilled in the art that other forms and modifications thereof may be employed without departing from the true spirit and scope of our invention. It is intended, therefore, that the foregoing disclosure is to be treated in an illustrative rather than a limiting sense and that the invention is to be considered as limited only by the scope of the appended claims.

What we claim as new and desire to secure by Letters Patent of the United States is:

1. Apparatus for collecting vegetation in roll form comprising, a rigid framework disposed generally parallel to the surface on which said vegetation is grown and having a first elongated member, a second elongated member, and end members connected to said elongated members adjacent the ends thereof, and with each of said elongated members and said end members being disposed in substantially the same plane; a plurality of concave vegetation-confining guides facing toward said surface and spaced from each other longitudinally of and above said framework, said guides being attached to each of said first and second elongated members, a plurality of concave teeth spaced from each other longitudinally of said framework, said teeth being mounted upon said second member and having a raking tip projecting downwardly from said framework, the inner curvature of said teeth substantially coinciding with the inner curvature of said guides, stabilizing means affixed to said framework adjacent said end members and extending below said framework sufficiently far to engage said surface and to prevent substantial longitudinal tipping of said framework, means for moving said framework across said surface in a raking direction thereby to engage said teeth with said vegetation and to detach said vegetation from said surface, said teeth being adapted to direct the detached vegetation toward said guide members with a roll forming movement and said guide members being adapted to form said detached vegetation into roll form during raking movement of said framework, means for lifting said framework from the formed roll of vegetation, and means for moving said framework freed of a first roll of vegetation in a reverse direction across said surface in preparation for the formation of a second roll of such vegetation.

2. Apparatus as defined in claim 1 including vertically extending reinforcing means attached jointly to the upper surface of said second elongated member and to the outer surface of said guides thereby to strengthen said guides during raking movement of said apparatus.

3. Apparatus as defined in claim 2 wherein said reinforcing means is disposed in the plane of both a guide and a tooth.

4. Apparatus as defined in claim 1 wherein the angular space of the downwardly facing opening between the lower portion of said first elongated member and the tip of said teeth as measured from a focal point of said concave guides is not less than about 120°.

5. Apparatus as defined in claim 1 wherein said guides are substantially semi-circular.

6. Apparatus for collecting vegetation in roll form comprising a rigid framework disposed generally parallel to the surface on which said vegetation is grown and having a first elongated member, a second elongated member, and end members connected to said elongated members adjacent the end thereof, and with each of said elongated members and said end members being disposed in substantially the same plane; a plurality of concave vegetation-confining guides facing toward said surface and spaced from each other longitudinally of and above said framework, said guides being attached to each of said first and second elongated members, a plurality of concave teeth spaced from each other longitudinally of said framework, said teeth being mounted upon said second member and having a raking end projecting downwardly from said framework, the inner curvature of said teeth substantially coinciding with the inner curvature of said guides, elongated stabilizing means affixed to said framework adjacent said end members and extending below said framework sufficiently far to engage said surface and to prevent substantial longitudinal tipping of said framework, means attached to said first elongated member at spaced points therealong and adapted to move said framework across said surface in a raking direction parallel to the axis of said stabilizing means thereby to engage said teeth with said vegetation and to detach said vegetation from said surface as said framework remains stabilized, said teeth being adapted to direct the detached vegetation toward said guide members with a roll forming movement and said guide members being adapted to form said detached vegetation into roll form during raking movement of said framework, means attached to said second elongated member at spaced points adjacent the ends thereof for lifting said framework from the formed roll of vegetation and adapted to lift both ends of said framework from said formed roll without substantial longitudinal tipping of said framework, and means for moving said framework freed of a first roll of vegetation in a reverse direction across said surface in preparation for the formation of a second roll of such vegetation.

7. Apparatus as defined in claim 6 wherein said elongated stabilizing means comprises a skid member having a fulcrum point adapted to contact said surface and about which said framework may be tilted transversely during the detaching of said framework from a formed roll of vegetation.

References Cited in the file of this patent
UNITED STATES PATENTS

| 735,257 | Hodgins | Aug. 4, 1903 |
| 1,154,357 | West | Sept. 21, 1915 |
| 2,050,133 | Smith | Aug. 4, 1936 |
| 2,053,970 | Price | Sept. 8, 1936 |
| 2,129,955 | Olson | Sept. 13, 1938 |
| 2,737,769 | Donald | Mar. 13, 1956 |